(12) United States Patent
Samworth

(10) Patent No.: US 8,401,794 B2
(45) Date of Patent: Mar. 19, 2013

(54) METHODS OF LOGGING GEOLOGICAL FORMATIONS

(75) Inventor: James Roger Samworth, Ashby de la Zouch (GB)

(73) Assignee: Reeves Wireline Technologies Limited, Loughborough (GB)

( * ) Notice: Subject to any disclaimer, the term of this patent is extended or adjusted under 35 U.S.C. 154(b) by 1033 days.

(21) Appl. No.: 12/100,262

(22) Filed: Apr. 9, 2008

(65) Prior Publication Data

US 2009/0240437 A1  Sep. 24, 2009

(30) Foreign Application Priority Data

Mar. 20, 2008 (GB) .................................. 0805253.2

(51) Int. Cl.
 *G01V 1/40* (2006.01)
(52) U.S. Cl. .......................................................... 702/7
(58) Field of Classification Search ................ 702/6–11, 702/13, 75, 76, 87, 90, 91, 93, 104, 106, 702/172; 324/333, 338, 339, 356; 367/25, 367/33, 43, 57; 382/109, 148, 149
 See application file for complete search history.

(56) References Cited

U.S. PATENT DOCUMENTS

| 4,297,879 | A | | 11/1981 | Howells et al. |
| 4,586,137 | A | | 4/1986 | Frost, Jr. et al. |
| 5,506,769 | A | | 4/1996 | Fu et al. |
| 6,606,565 | B1 | * | 8/2003 | Strickland et al. ................ 702/7 |
| 2005/0171697 | A1 | * | 8/2005 | Heliot et al. ...................... 702/6 |
| 2006/0106541 | A1 | * | 5/2006 | Hassan et al. ..................... 702/6 |
| 2006/0155475 | A1 | * | 7/2006 | Yin .................................. 702/14 |

FOREIGN PATENT DOCUMENTS

EP  0539272  4/1993

OTHER PUBLICATIONS

Collins, Jake, Combined Search and Examination Report under Sections 17 & 18(3), Jul. 11, 2008, 2 pages, UK Intellectual Property Office, UK.
Collins, Jake, Patents Act 1977: Search Report under Section 17, Jul. 10, 2008, 2 pages, UK Intellectual Property Office, UK.

\* cited by examiner

*Primary Examiner* — Mohamed Charioui
(74) *Attorney, Agent, or Firm* — Mark A. Oathout; Oathout Law Firm

(57) ABSTRACT

A method of processing geological log data obtained from use of one or more logging tools and including at least a first log having a relatively poor attribute and a corresponding, second log having a relatively good said attribute comprises the step of incorporating into the first log characteristics of the second log that confer improvements in the said attribute, characterised in that the incorporating step includes modulating the extent of incorporation into the first said log of the said characteristics without distorting geologically significant information in the first log.

18 Claims, 8 Drawing Sheets

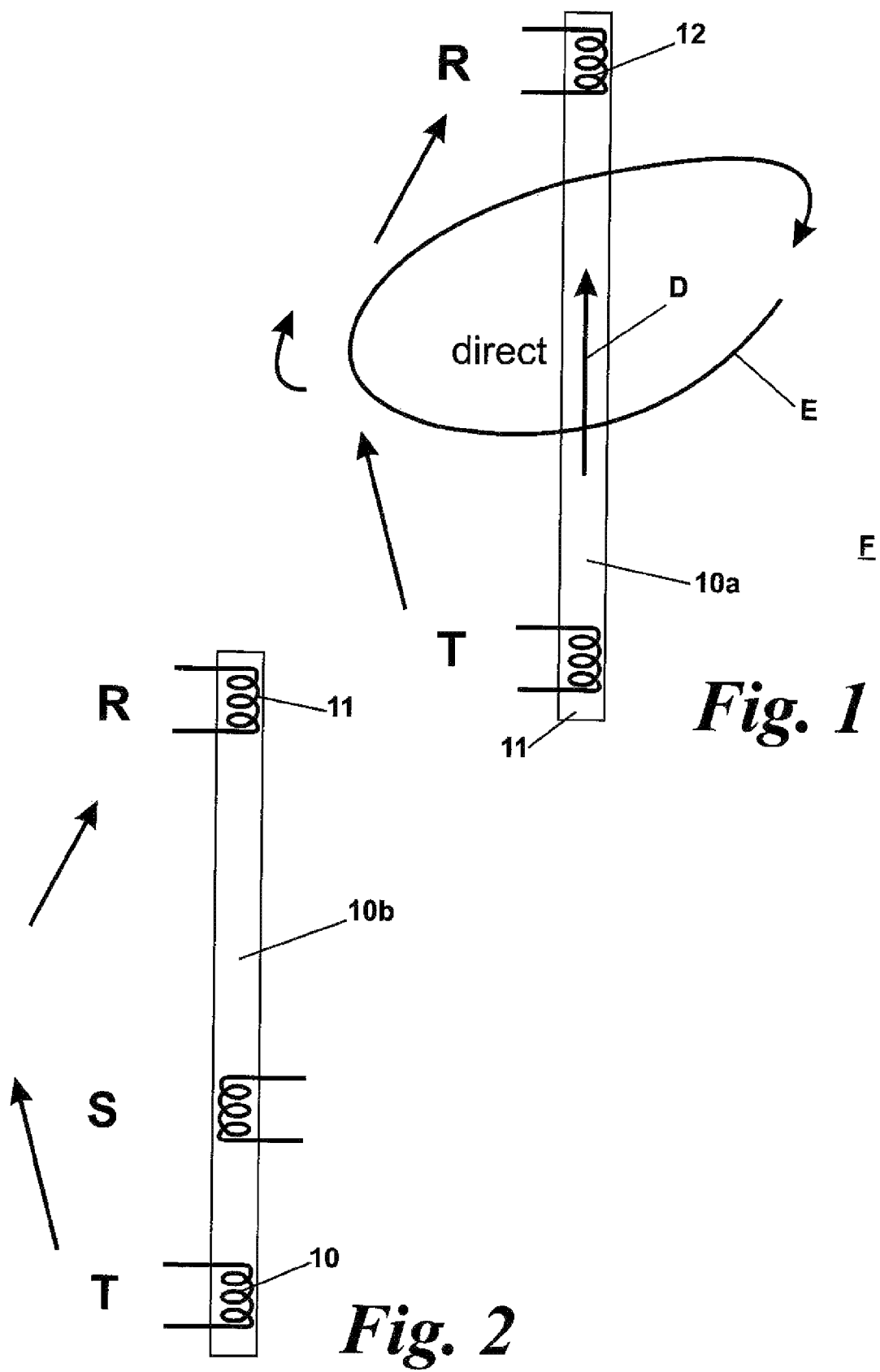

Short log      *     long response   => complementary log
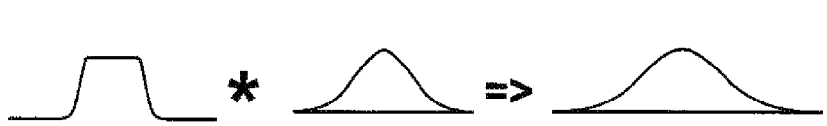
*Fig. 6a*
long log      *     short response   => complementary log
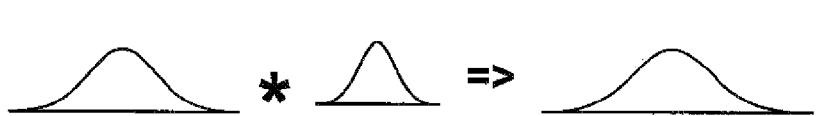
*Fig. 6b*
Complementary filtered <u>short</u> log    /    short log
*Fig. 6c*
=>  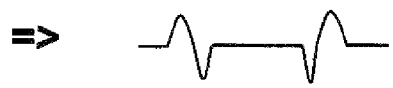
=>  ratio log
Complementary filtered <u>long</u> log    /    ratio
*Fig. 6d*
=>  
=>  long log with short resolution

METHODS OF LOGGING GEOLOGICAL FORMATIONS

CROSS-REFERENCE TO RELATED APPLICATIONS

This application claims the foreign priority of GB patent application number 0805253.2 filed Mar. 20, 2008.

STATEMENTS REGARDING FEDERALLY SPONSORED RESEARCH OR DEVELOPMENT

Not Applicable.

REFERENCE TO A MICROFICHE APPENDIX

Not Applicable.

This invention concerns improvements in or relating to methods of logging geological formations.

The logging of geological formations is, as is well known, economically an extremely important activity.

Virtually all commodities used by mankind are either farmed on the one hand or are mined or otherwise extracted from the ground on the other, with the extraction of materials from the ground providing by far the greater proportion of the goods used by humans.

It is extremely important for an entity wishing to extract materials from beneath the ground to have as good an understanding as possible of the conditions prevailing in a region from which extraction is to take place.

This is desirable partly so that an assessment can be made of the quantity and quality, and hence the value, of the materials in question; and also because it is important to know whether the extraction of such materials is likely to be problematic.

The acquisition of such data typically makes use of techniques of logging. Logging techniques are employed throughout the mining industry, and also in particular in the oil and gas industries. The invention is of benefit in logging activities potentially in all kinds of mining and especially in the logging of reserves of oil and gas.

In the logging of oil and gas fields specific problems can arise. Broadly stated this is because it is necessary to consider a geological formation that typically is porous and that contains a hydrocarbon-containing fluid such as oil or gas or (commonly) a mixture of fluids only one component of which is of commercial value.

This leads to various complications associated with determining physical and chemical attributes of the oil or gas field in question. In consequence a wide variety of logging methods has been developed over the years. The logging techniques exploit physical and chemical properties of a formation usually through the use of a logging tool or sonde that is lowered into a borehole (that typically is, but need not be, a wellbore) formed in the formation by drilling.

Typically the tool sends energy into the formation and detects the energy returned to it that has been altered in some way by the formation. The nature of any such alteration can be processed into electrical signals that are then used to generate logs (i.e. graphical or tabular representations containing much data about the formation in question)

The borehole usually is several tens of thousands of feet in length yet is narrow (being perhaps as narrow as 3 inches (about 76 mm) or less in diameter), although in practice such a borehole is almost never of uniform diameter along its length. The small diameter and great length of a typical borehole mean that there are particular problems associated with accurately obtaining physical data through operation of the logging tool and then reliably transmitting the data to a surface location. Indeed it could be said that almost all log data are obtained by processes that involve at least some degree of compromise.

An aim of the invention is to improve the quality of log data obtained using any of several logging tool types.

One particular kind of logging technique, that is known as induction logging, makes use of an induction logging tool. The method of the invention defined hereinbelow particularly but not exclusively is suitable when it is necessary to process data obtained using an induction logging tool.

During induction logging an induction tool typically is lowered into and subsequently removed from a borehole on a wireline the nature and purpose of which are well known in the logging art. Like most logging tools the induction tool is an elongate cylinder having at spaced intervals along its length various components whose function is to transmit energy (that in the case of the induction tool is electrical energy) through a geological formation and receive (by induction in the case of the induction tool) energy that is indicative of attributes of the formation. The logging tool converts such energy into signals that may be transmitted via the wireline and/or recorded for later use.

Broadly stated an induction tool includes a transmitter that induces current, according to a per se known technique, in the formation surrounding the tool at the depth to which the tool has been lowered. The induction tool also includes at least one and, in practical versions, several receivers of induced current energy.

FIG. 1 illustrates the operation of a simple form of induction tool 10a.

As is apparent from FIG. 1, a transmitter T shown schematically as a coil 11 induces eddy currents E in the formation F. These travel through the formation, that includes the hydrocarbon-bearing fluid under investigation, to be detected by a receiver R also in the form of a coil 12. The receiver coil R couples the eddy currents and is spaced from the transmitter coil T by a distance selected to make the signal at the receiver R preferentially responsive to the eddy currents circulating in a certain range of distances into the geological formation F around the well-bore. The distance in the formation from which half the signal at the receiver originates is commonly assigned as the depth of penetration of that receiver.

At the same time as the eddy currents E are transmitted however, direct induction of current in the receiver occurs via a transmission path D constituted by the logging tool itself. Current transmitted via this direct path is referred to herein as primary current.

The phase of the eddy current in the formation and of the primary current directly transmitted to the receiver is shifted 90 degrees with respect to the transmitter current during transmission. The formation eddy current itself induces a further signal in the receiver, phase shifted by a further 90 degrees, making this signal have a phase shift of 180 degrees compared with the transmitter current.

The expression $-\sigma\omega^2 e^{-i\omega t} + i\omega e^{-i\omega t}$ therefore represents the total current received at the receiver R as a result of the two modes of transmission, with $-\sigma\omega^2 e^{-i\omega t}$ representing the eddy currents and $i\omega e^{-i\omega t}$ the directly-induced current.

The primary current component is undesirable since it contains no information about the geology. Therefore the primary current may be regarded as noise. This noise tends to dominate the signal generated by the receiver R, thereby rendering its output potentially of low or zero value.

In the prior art it has been proposed to filter this noise though the use of a phase detector in the induction logging tool 10*a* in order to eliminate the effect of the primary induced current. A problem with this approach however is that the (90 degree-shifted) directly coupled, primary current is very significantly larger than the secondary (180 degree-shifted) current. The type of phase detector that is suitable for use in a logging tool frequently is not sufficiently sensitive to allow detection of the secondary current under such circumstances. Therefore the approach of using a phase detector alone to compensate for the undesirable primary current is sub-optimal.

Another approach adopted in the prior art is to employ in the logging tool intermediate the transmitter T and receiver R a secondary coil S (shown in the tool 10*b* of FIG. 2) whose design (especially in terms of the phasing of its windings) and location are such as to cancel the direct, primary current.

Invasion, as is well known in the art, refers to a situation in which fluid (such as drilling fluid or chemicals added during or after drilling) invades the (porous) formation surrounding the borehole. In the art the invasion is assumed to be of "step" profile, i.e. there is assumed to be an abrupt transition from invaded to non-invaded geology. Although this is not strictly an accurate way of describing invasion, for processing purposes it is usually reckoned to be sufficiently accurate. The term "invasion diameter" is used to indicate the extent of the assumedly circular region of invasion surrounding a borehole.

The resistivity of the invaded zone is different to and often less than the resistivity of the non-invaded zone that surrounds it. In the case of logging the formation using an electrode-based resistivity logging tool that is known in the art the resistances of the well-bore, invaded and non-invaded parts may be considered as being in series and hence as additive. As a result the error contributed by a low resistance invaded zone or by well-bore irregularities is small compared to the resistance of the non-invaded remainder of the formation under investigation, and the overall resistivity value obtained is acceptably accurate.

It is not always possible or desirable to use an electrode-based resistivity tool for the purpose of analyzing a formation by assessing resistance values. An induction tool is often preferred due to its favourable attributes as is known in the art.

A major disadvantage of using such a tool however in invaded formations is that the resistances of the well-bore, invaded and non-invaded regions appear in parallel (since the induced eddy currents pass through these regions simultaneously in passing to the receiver coil). As a result any lower resistivity of the invaded region contributes a very significant error to the overall measured resistivity. Indeed the eddy current induced through the invaded zone and through the well-bore fluid itself, especially if the well-bore is of an irregular shape, can be comparable to the primary current discussed above, such that the log produced under such circumstances may be unusable. This is because the contribution by the part of formation of interest is small compared to the contribution from the invaded zone and the well-bore The problems that arise in relation to the assumed invasion profile of a well are exemplary of a range of signal processing difficulties that can arise when using an induction logging tool. The method of the invention is applicable to a range of problems and, indeed, to a range of tool types. One particular type of tool, among others to which the invention pertains, is an induction logging tool.

In order to alleviate the problems of using induction tools in invaded formation zones one arrangement adopted in the prior art involves the inclusion of multiple (e.g. four) receiver coils and corresponding secondary coils in the induction logging tool at different spacings from the transmitter coil T. The outputs of the plural receiver and secondary coils can then be combined according to a subtle algorithm that assigns weighting and sign values to the outputs of the coils so as to cancel the dramatic effects of the resistivity disparities of the invaded, non-invaded and well-bore regions. A tool including multiple coils of this nature is sometimes referred to as an "array tool" or a "multiple array tool". Such tools were first proposed in the 1980's.

An array tool 10*c* is visible in FIG. 3. In the tool 10*c* of FIG. 3 there are four secondary coils S1, S2, S3, S4 and four receiver coils R1, R2, R3, R4. The receiver coils R and the secondary coils S are designed and positioned so as to maximize the desired noise cancelling effect.

As is indicated above the induction logging tool is a narrow cylinder, containing a coil array, that typically might be 1.5 metres or more in length. In such a tool 10*c* as shown in FIG. 3 the receiver coils R are spaced over a significant distance such that the signals from them each relate to different depths of the formation. In addition the multiple secondary coils S are also spaced over part of the length of the tool.

The effect overall of these features is that the so-called "vertical resolution" of an induction logging tool having plural secondary and receiver coils may be unacceptably poor. An aim of the invention therefore is to improve the vertical resolution of such a tool.

In this regard researchers in the art are familiar with the vertical response function, that is characteristic of a particular logging tool. When a logging tool is logged through a well, the log that is produced does not precisely reflect the geology. It is distorted and "blurred" by the tool itself. The property of the tool that does this is known as the tool Vertical Response Function, and can be visualised as the log produced from a single very thin bed as shown in FIG. 9. This Vertical Response Function can be calculated theoretically for each coil pair and a good knowledge of its form is important when resolution matching the measurements from coil pairs of differing spacings.

The variability of the vertical resolution as determined by the vertical response functions of the coils of a particular tool means that the outputs of differing receivers or detectors in the tool may not be accurately combined since they are not resolution-matched.

In the prior art it is known to use the output of the longest-spaced receiver coil (the terms "long-spaced" and "short-spaced" being known to the worker of skill in the art) as it has the deepest "depth of investigation" into the formation, but in that case the output signal curves corresponding to the corrections by the other receiver coils are not well resolution-matched. It is then necessary to employ a technique that involves the imposition of the resolution of a short-spaced receiver coil onto such curves in order to improve their matching. Prior art techniques of this kind are computationally cumbersome and are not broadly applicable.

A further problem with known logging techniques used under the circumstances described above relates to the generation of undesirable spikes in the logs. This can be a consequence when a short-spaced resolution is imposed on the output of a long-spaced receiver as outlined, since the short-spaced coil is very sensitive to well-bore irregularities.

In addition to being much less sensitive to these wellbore irregularities, it is well known in the art that electrode-based resistivity tools can provide vertical resolutions that are much finer than those from induction tools, and one advantage of the invention is to provide a method that permits the combining of favourable attributes of electrode-based and induction tools.

According to the invention in a first aspect there is provided a method of processing geological log data obtained from use of one or more logging tools and including at least a first log having a relatively poor attribute and a corresponding, second log having a relatively good said attribute the method comprising the step of incorporating into the first log characteristics of the second log that confer improvements in the said attribute, characterised in that the incorporating step includes modulating the extent of incorporation into the first said log of the said characteristics without distorting geologically significant information in the first log.

Modulating the extent to which the attributes of a second log are imposed on a first log makes it possible to avoid seeking to impose on a first log characteristics of a second log that is not well matched with the first log (or makes it possible to ensure that such imposition occurs only when there is good matching).

Preferably the attribute of the logs is the vertical resolution; the first said log is a relatively low-resolution log and the second said log is a relatively high-resolution log.

In an alternative embodiment of the invention the attribute is the robustness of the log to well irregularities.

Preferably the receivers generate respective signals corresponding to the conductivity of the geological formation. Operating in the conductivity domain is advantageous since the eddy currents are then additive when using an induction tool. This in turn confers benefits e.g., when logging an invaded zone.

Use of the method of the invention therefore is beneficial since it improves vertical resolution generally. Furthermore since it imposes e.g. high resolution characteristics on a log containing much geological data it advantageously eliminates the log spikes referred to above and it allows more successful use, than in the prior art, of the techniques of resolution imposition without inducing distortion.

In more detail the first log preferably is a relatively low-resolution log and the second log is a relatively high-resolution log; and the incorporating step preferably includes:

(i) convolving the first low-resolution, log with the response of the detector or receiver responsible for the second log to generate a complementary filtered low-resolution log;

(ii) convolving the second, high-resolution log with the response of the detector or receiver responsible for the first log to generate a complementary filtered high-resolution log that exactly matches the complementary filtered low-resolution log of Step (i);

(iii) dividing the complementary filtered high-resolution log by the second log to generate a ratio log; and (iv) dividing the complementary filtered low-resolution log of Step (i) by the ratio log to generate a log containing the geological information of the first log and having the vertical resolution of the second log.

Conveniently the first log is derived from signals generated in an induction logging tool by a relatively long-spaced detector or receiver; and optionally the second log is derived from signals generated in an induction logging tool by a relatively short-spaced detector or receiver.

Alternatively the second log may be an electrode-based resistivity log.

Preferably the step of modulating the extent of incorporation into the first log of the said characteristics occurs in dependence on the value of a zeroed coefficient of semblance between the two said logs.

The term "zeroed semblance" is explained in more detail hereinbelow, semblance being a perse known quality of a pair of logs.

More preferably the method includes the step of determining an enhancement coefficient that is the product of the coefficient of the zeroed semblance and the ratio of resistivity values determined from each said log. This is done for purposes of resolution enhancement as described hereinabove.

Conveniently the zeroed semblance is derived by filtering the semblance between two of the said logs using a filter that passes a signal in a spatial frequency band that has zero transmission at zero frequency.

Conveniently the method includes the step of deriving the zeroed coefficient of semblance from the logarithms of the logs or one or more functions of the logs Thus the coefficient of semblance may be derived in any of a range of ways.

In a further aspect the invention resides in a log generated in accordance with a method as defined hereinabove.

There now follows a description of preferred embodiments of the invention, by way of non-limiting example, with reference being made to the accompanying drawings in which:

FIG. 1 shows in schematic form a simple form of induction logging tool;

FIG. 2 shows such a tool including a secondary coil S whose purpose is to eliminate the effects of directly coupled, primary currents;

FIGS. 6a-6d illustrate in schematic form one exemplary embodiment of the resolution (or other attribute) enhancement method of the invention;

Figure 3:
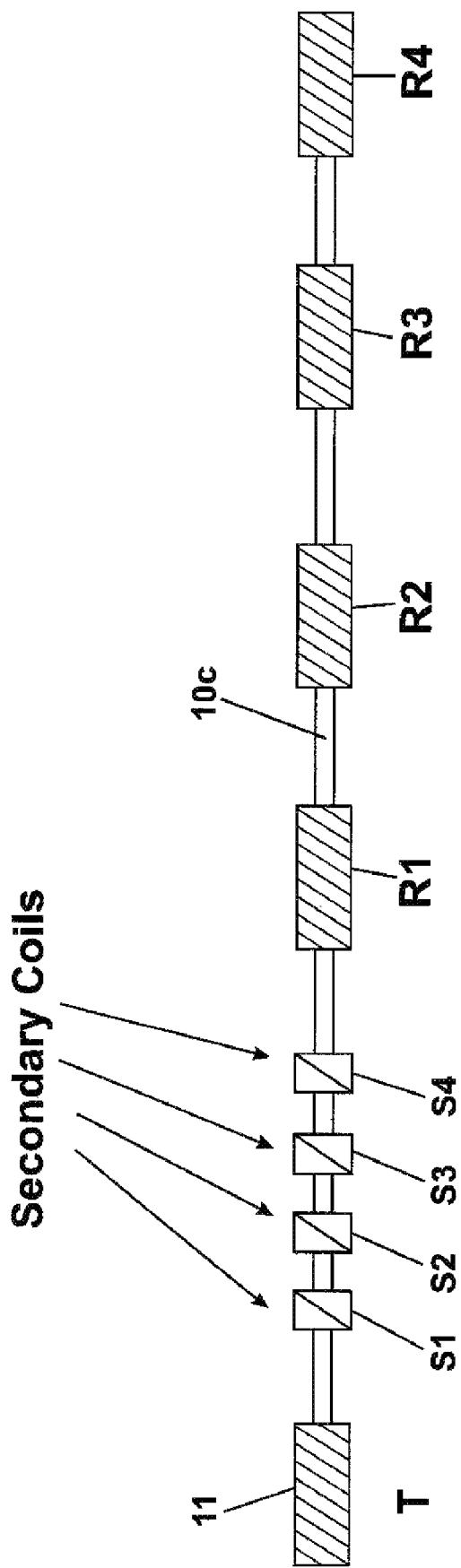
FIG. 3 shows an array induction logging tool.
Figure 5:
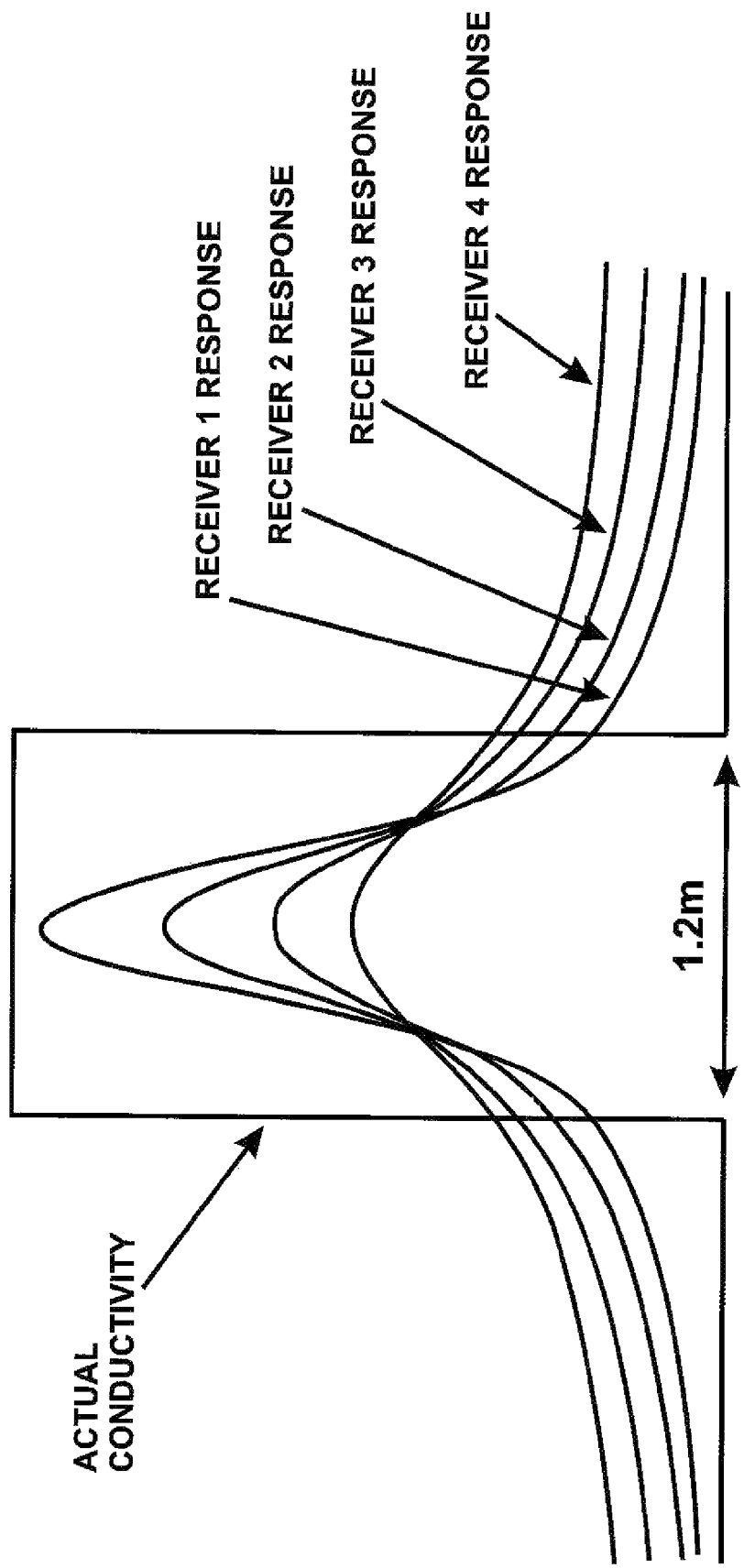
FIG. 5 is a plot illustrating some vertical resolution problems that can derive from use of the array type of induction logging tool.

As best illustrated in FIG. 5 the use in an array tool 10c (FIG. 3) of plural receivers R1, R2, R3, R4 coupling induced currents generated by a transmitter T that are modified by respective secondary coils S1, S2, S3 & S4 results in a corresponding plurality of conductivity logs that are not resolution-matched. This is explained schematically in FIG. 5, that plots the response functions (labeled, respectively, "Receiver 1 Response", "Receiver 2 Response" and so on) of each of the receivers R1, R2, R3, R4. In FIG. 5 each of the response functions is of differing shape than its neighbour. In consequence the depth at which each log produced by a respective receiver R1, R2, R3, R4 attains a given conductivity value is not the same either.

FIG. 5 shows in a thick solid line (labeled "actual conductivity") the assumed conductivity of the geological formation penetrated by a well. This figure illustrates that the differences in vertical resolution of the different receivers of the tool can have a pronounced effect on the accuracy of the resultant log.

As explained it is desirable to improve the vertical resolution of a plurality of log curves. This can be achieved by a technique of imposing the resolution of a log having a good vertical resolution characteristic on another log have a poorer such characteristic.

Such a technique is known per se but as mentioned a problem with it is that if the logs in question are each measuring different parts of the formation the imposition technique can give inaccurate results.

Considering a pair of logs (i.e. short and long logs derived respectively from short- and long-spaced filters of e.g. an induction tool) of differing vertical resolution attributes, since each log is a convolution of its response with the geology, and in accordance with the method of the invention:

(Short response)*(geology)=(Short log)

(Long response)*(geology)=(Long log)

If, then, the short log is convolved with the long log's response function, and the long log is convolved with the short log's response function, the result is:

(Short log)*(long response)=(Short response)*(geology)*(long response)

(Long log)*(short response)=(Long response)*(geology)*(short response)

Since convolution is a commutative process, the right hand sides of these equations are identical, ie there exists a perfect resolution match between resulting short and long logs that have each been filtered by the response of the detector/receiver that is responsible for generating the other.

This is best illustrated by FIGS. 6a and 6b. These show that following convolution as explained above the two complementarily filtered logs are identical. In FIG. 6a there is shown at the right hand side the short log filtered in this fashion; and in FIG. 6b the long log following such filtering.

Further in accordance with the method of the invention as shown in FIG. 6c if one divides the filtered short log of FIG. 6a by the short log itself the result is a ratio log. The complementary filtered long log of FIG. 6b may then be divided by this log as shown in FIG. 6d. The result of this process is a log that contains the geological information of the long log while having the resolution attribute of the short log. This is a key aim of the invention.

Instead of combining short-spaced and long-spaced receiver outputs of an induction tool in the manner illustrated in FIG. 6 the method of the invention could be applied to a range of pairs of logs an attribute of one of which is better than the corresponding attribute of the other. In consequence the method of the invention is applicable for example when it is desired to improve the resolution of an induction log by imposing the resolution of a resistivity log. In such a case the method of the invention as outlined with reference to FIGS. 6a-6d would be essentially the same as illustrated, except that the short log would be replaced by e.g. a fine resolution, focused electrode log.

Figure 4:
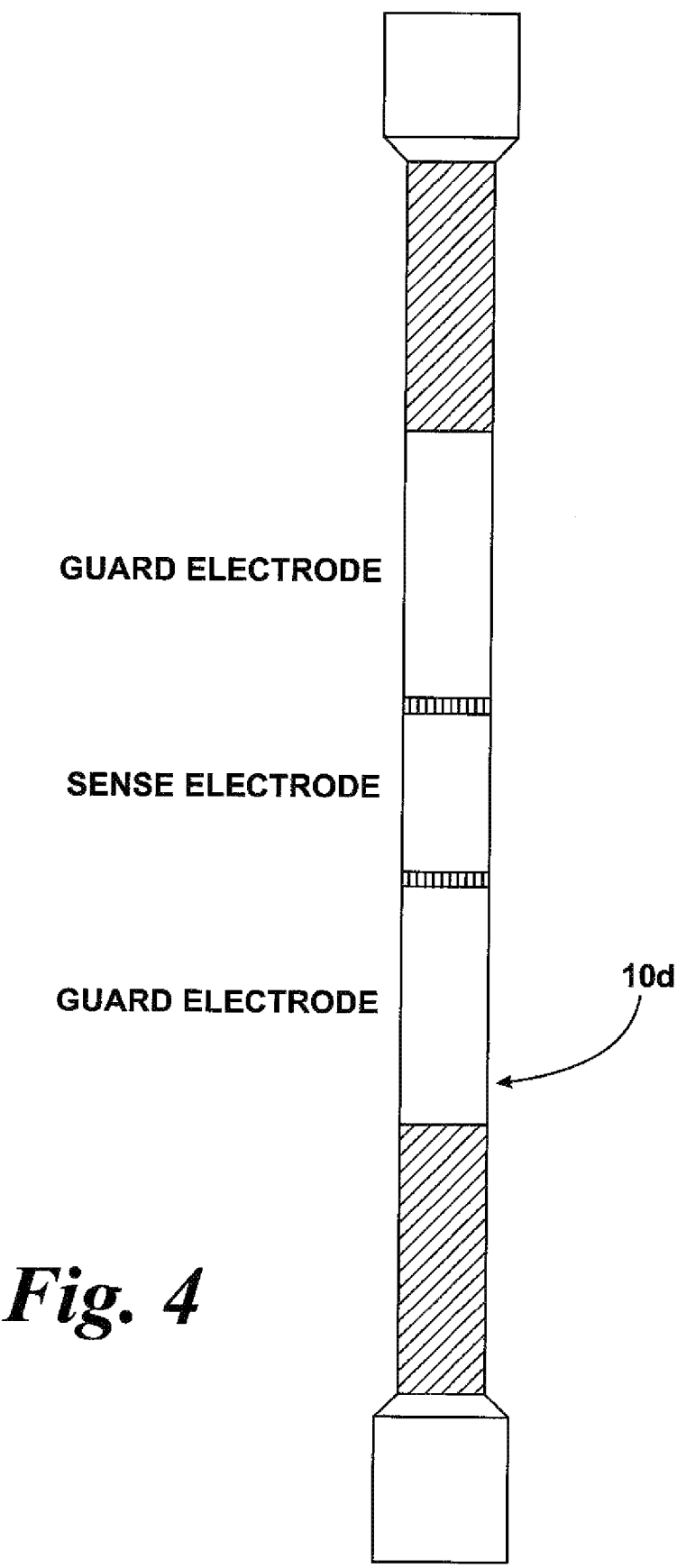
FIG. 4 shows an electrode-type resistivity tool.

An example of a resistivity tool 10d is shown schematically in FIG. 4. The features of such a tool will be well known to the worker of skill in the art and need not be described in detail herein. It is however important to note that as in the case of induction tools a resistivity tool need not adopt the cylindrical shape shown in FIG. 4 and may employ any of a range of configurations and operating principles. The method of the invention is applicable using a variety of such tools.

Furthermore the attribute enhanced using the method of the invention need not be the vertical resolution.

As explained, the output of a short-spaced receiver in an induction tool exhibits good vertical resolution characteristics but is highly sensitive to borehole irregularity, especially when invasion of the geology surrounding the borehole by a conducting (typically, saline) fluid has occurred.

Using the method of the invention, when the high-resolution log is from an electrode-based resistivity tool, the robustness of the resultant log to such irregularity is dramatically improved. This is because, as noted, the log shown in FIG. 6d contains the geological information of the long log and the insensitivity to well-bore irregularities of an electrode based resistivity log. This log is not sensitive to irregularity of the borehole (since the effects of any irregularity are proportionately less in the long log data than in the short log data). Therefore by using the method of the invention the robustness of the data to the effects of any irregularity are improved while giving rise to a log having the good vertical resolution characteristic of the short log.

The extent to which the resolution of the short log may be imposed on the long log data may in accordance with the invention be modulated. The preferred technique for achieving such modulation is shown in FIGS. 7a-7f.

FIGS. 7a, 7b, 7c and 7d show four logs that may be any of a range of types of log (and that are shown as induction logs for illustrative purposes only) in schematic form. As is evident FIG. 7b ("Curve 2") shows the same curve as FIG. 7a ("Curve 1") except that the curve is shifted.

Figure 7A:
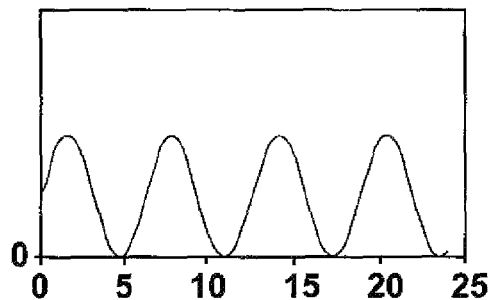
FIGS. 7a-7f illustrate in schematic form a technique for further modulating the enhancement of the vertical resolution of a plurality of logs.
Figure 7B:
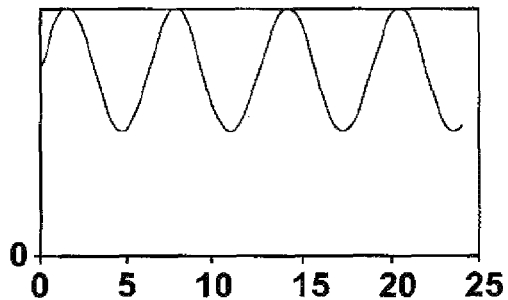
Figure 7C:
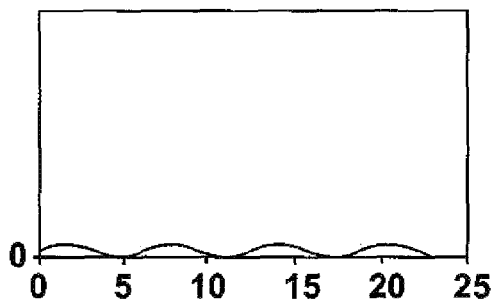
Figure 7D:
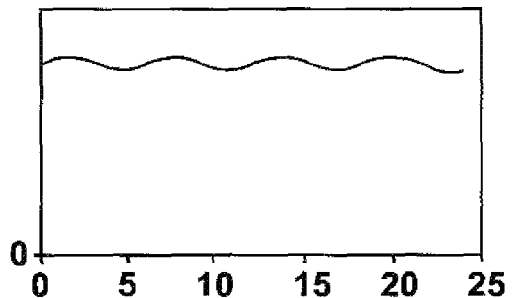

"Curve 3" of FIG. 7c is not the same curve as Curve 1 since its amplitude is different. "Curve 4" of FIG. 7d is Curve 3 shifted in a similar manner to Curve 2.

The correlation of all four curves is perfect since this is a function that is sensitive only to the shape of a curve, and not to amplitude or shift. This function therefore is of no help in ensuring that the curves are all measuring the same part and therefore parameters of the formation. In other words the even though the curves plainly have different sensitivities and measure different parts of the formation an attribute imposition technique based on correlation would not eliminate the erroneous results indicated above as being undesirable.

Semblance on the other hand is a function that is sensitive to the absolute amplitude.

The semblance between all the curves is poor. None of the curves has the same absolute amplitude value, at a given point on the x-axis, as any of the others. Therefore it would not be possible to use semblance as a means of establishing whether any two of the curves relate to the same part of the formation when seeking to impose a high resolution attribute of one of them on another that is of lower resolution.

If however the curves are filtered using a filter that "zeroes" them, i.e. that filters two of the said logs using a filter that passes a signal in a spatial frequency band that has zero transmission at zero frequency, the semblance is improved.

Figure 7E:
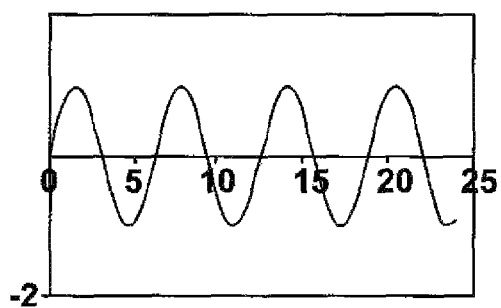
Figure 7F:
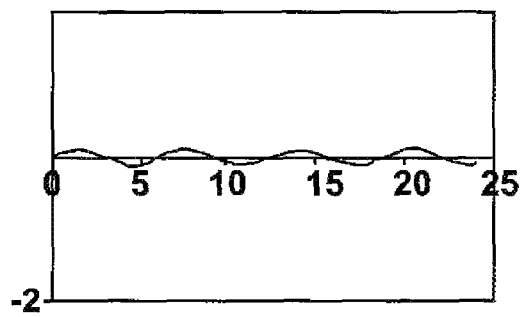

FIGS. 7e and 7f show the effects of filtering ("Curve 5", FIG. 7e) Curves 1 and 2 on the one hand and ("Curve 6", FIG. 7f) Curves 3 and 4 on the other using such a zeroing filter. As illustrated in each case this makes the curves of the same amplitude the same as one another by eliminating the effect of the shift referred to above.

Following such filtering the semblance of Curves 1 and 2 is perfect. The semblance of curves 3 and 4 is also perfect; but the semblance of Curves 5 and 6 is poor, implying that following filtering Curve 1 may be used to influence the resolution of Curve 2 and vice versa but neither of Curves 3 or 4 may be so used. The converse is also true.

It follows that through using a zeroing filter in this way an "automatic" filtering technique arises since the logs that the curves represent are brought into vertical alignment and then the semblance value indicates either a good or a poor extent to which one curve of a pair may be used to influence the other. Such a filter therefore conveniently may be employed in order to limit the extent to which the method of the invention imposes a good log attribute on a log that exhibits the said log attribute only poorly. The method can be employed only when the "zeroed semblance" value attains a predetermined value, or lies within a predetermined range of values. In this way operation of the method of the invention may be made "self-regulating".

The filter may be embodied in software or may be hard wired, depending on the precise apparatus used to process the log data. The filter may if desired be incorporated into an induction logging tool or may exist e.g. at a surface location.

The technique of filtering as described before establishing the semblance of two curves is referred to herein as the use of a "zeroed semblance" technique. A "zeroed semblance coefficient" is one by which a given log is multiplied in order to give effect to the resolution imposition that is desired.

Overall the techniques disclosed herein permit significant improvements in the resolution of logs of various especially gas and oil-bearing formation that hitherto have been regarded as difficult to log accurately.

Figure 8:
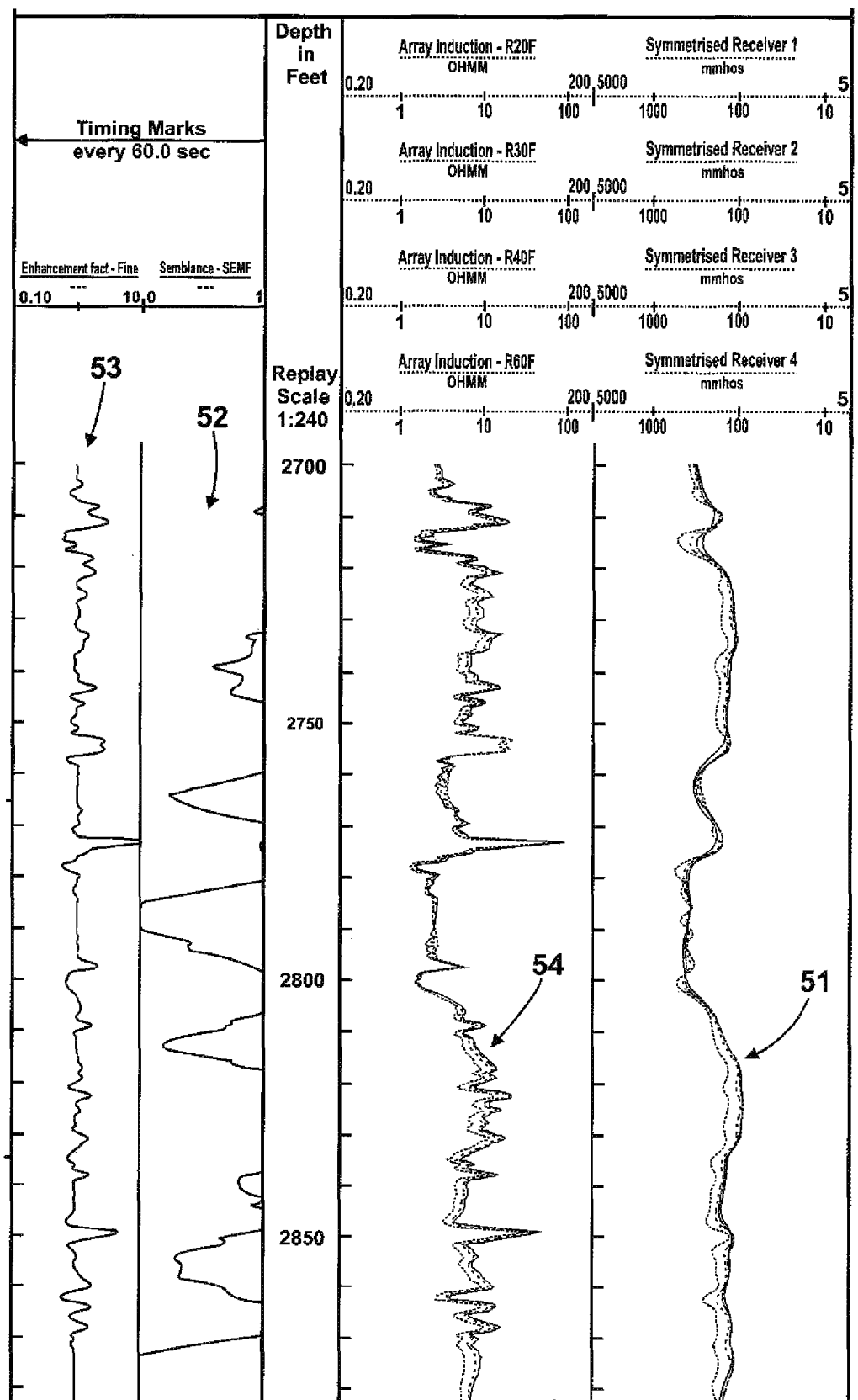
FIG. 8 illustrates the extent to which the vertical resolution of an induction log may be improved using the method of the invention.
Figure 9:
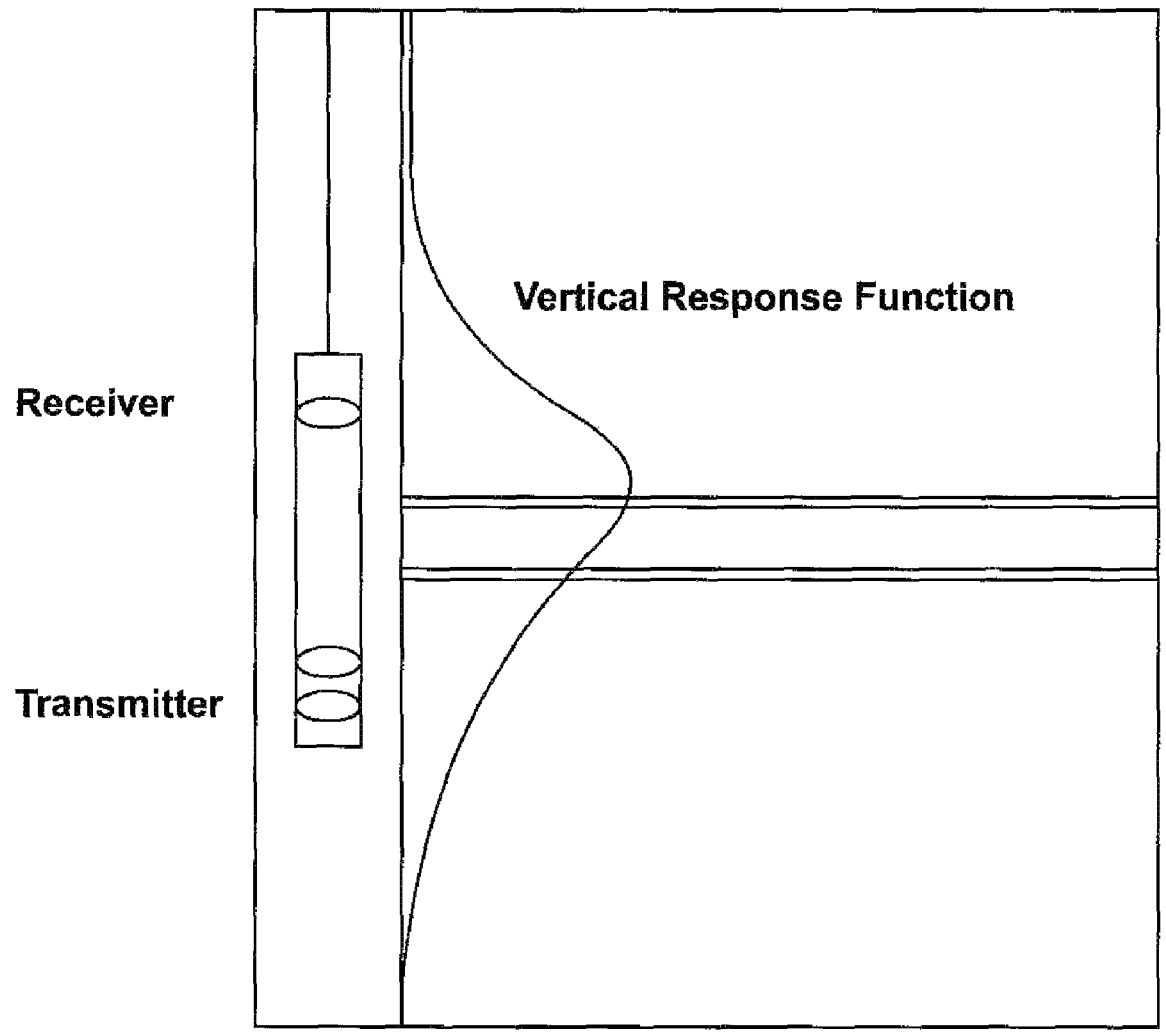
FIG. 9 is a schematic illustration of a typical tool vertical response function.

The degree of resolution improvement available using the method of the invention is illustrated in exemplary (non-limiting) fashion by FIG. 8. This figure shows a first, induction log 51 (on a logarithmic scale) obtained using receivers such as receivers R1-R4 of FIG. 3. The vertical resolution of this log is not good and therefore it is almost impossible to distinguish particular zones of the geology as having particular characteristics.

Plot 52 of FIG. 8 shows on a linear scale the zeroed semblance function (as explained herein), between low and high resolution logs, that may be used to enhance the resolution of the log 51 according to the method described herein with reference to FIGS. 7a-7f.

Plot 53 is the final enhancement factor that results from a combination of the semblance function and the complementary filtering operation described with reference to FIGS. 6a-6d hereof.

Neither plot 52 nor plot 53 has a constant value. On the contrary, the values of the enhancement factor plots 52 and 53 are constantly varying over the length of the log 51. This illustrates that the extent to which enhancement of the log resolution occurs varies according to the extent to which it is needed in order to improve the resolution of the log 51.

The result of the enhancement method of the invention is visible as log 54 in FIG. 8. As is self-evident, the vertical resolution of this log is very considerably greater than that of log 51 despite the log 54 containing exactly the same geological information as log 51. FIG. 8 therefore exemplifies that the method of the invention can produce dramatic resolution improvements at low cost and with very considerable efficiency.

The invention claimed is:

1. A method of improving a resolution of an induction logging tool including processing geological log data obtained from use of one or more logging tools and including at least a first log and at least a corresponding second log that exhibit an attribute to an unequal extent, the method comprising the steps of:
    transmitting energy through a geological formation;
    receiving energy that is indicative of characteristics of the geological formation;
    converting the received energy into signals;
    generating the first log and the second log; and incorporating into the first log characteristics of the second log that confer improvements in the said attribute, characterised in that the incorporating step includes modulating the extent of incorporation into the first said log of the said characteristics without distorting geologically significant information in the first log;
    wherein the attribute of the logs is the vertical resolution;
    wherein the vertical resolution of the first log is lower than the vertical resolution of the second log; and
    wherein the first log is derived from the signals generated in the logging tool by an induction long-spaced detector or receiver.

2. A method according to claim 1 wherein the step of modulating the extent of incorporation into the first log of the said characteristics of the second log occurs in dependence on the value of a zeroed coefficient of semblance between the two said logs.

3. A method according to claim 2 wherein incorporation into the first log of the said characteristics of the second log occurs when the zeroed coefficient of semblance attains a predetermined value.

4. A method according to claim 2 or claim 3 including the step of determining an enhancement coefficient that is the product of the coefficient of the zeroed semblance and a ratio of resistivity values determined from each said log.

5. A method according to claim 2 or claim 3 wherein the zeroed semblance is derived by filtering the semblance between two of the said logs using a filter that passes a signal in a spatial frequency band that has zero transmission at zero frequency.

6. A method according to claim 2 or claim 3 including the step of deriving the zeroed coefficient of semblance from the logarithms of the logs or one or more functions of the logs.

7. A method according to claim 1 wherein the incorporating step includes:
    (i) convolving the first, low-resolution log with the response of the detector or receiver responsible for the second, high-resolution log to generate a complementary filtered high-resolution log;
    (ii) convolving the second, high-resolution log with the response of the detector or receiver responsible for the first, low-resolution log to generate a complementary filtered low-resolution log;
    (iii) dividing the complementary filtered high-resolution log by the second log to generate a ratio log;
    (iv) dividing the complementary filtered low-resolution log by the ratio log to generate a log containing the geological information of the first log and having the vertical resolution of the second log.

8. A log generated in accordance with the method according to claim 1, claim 7, claim 2 or claim 3.

9. A method according to claim 1 or claim 7 wherein the second log is derived from signals generated in an induction logging tool by a short-spaced detector or receiver.

10. A method according to claim 1 or claim 7 wherein the second log is an electrode-based resistivity log.

11. A method of improving a resolution of an induction logging tool including processing geological log data obtained from use of one or more logging tools and including at least a first log and at least a corresponding second log that exhibit an attribute to an unequal extent, the method comprising the steps of;
    transmitting energy through a geological formation;
    receiving energy that is indicative of characteristics of the geological formation;
    converting the received energy into signals;
    generating the first log and the second log; and
    incorporating into the first log characteristics of the second log that confer improvements in the said attribute, characterized in that the incorporating step includes modulating the extend of incorporation into the first said log of the said characteristics without distorting geologically significant information in the first log;
    wherein the attribute of the logs is the vertical resolution;
    wherein the vertical resolution of the first log is lower than the vertical resolution of the second log;

wherein the incorporating step includes:
- (i) convolving the first, low-resolution log with the response of the detector or receiver responsible for the second, high-resolution log to generate a complementary filter high-resolution log;
- (ii) convolving the second, high-resolution log with the response of the detector or receiver responsible for the first, low-resolution log to generate a complementary filtered low-resolution log;
- (iii) dividing the complementary filtered high-resolution log by the second log to generate a ratio log;
- (iv) dividing the complementary filtered low-resolution log by the ratio log to generate a log containing the geological information of the first log and having the vertical resolution of the second log; and wherein the first log is derived from the signals generated in the logging tool by an induction long-spaced detector or receiver.

12. A method according to claim 11 wherein the step of modulating the extent of incorporation into the first log of the said characteristics of the second log occurs in dependence on the value of a zeroed coefficient of semblance between the two said logs.

13. A method according to claim 12 wherein incorporation into the first log of the said characteristics of the second log occurs when the zeroed coefficient of semblance attains a predetermined value.

14. A method according to 13 including the step of determining an enhancement coefficient that is the product of the coefficient of the zeroed semblance and a ratio of resistivity values determined from each said log.

15. A method according to claim 14 wherein the zeroed semblance is derived by filtering the semblance between two of the said logs using a filter that passes a signal in a spatial frequency band that has zero transmission at zero frequency.

16. A method according to claim 15 including the step of deriving the zeroed coefficient of semblance from the logarithms of the logs or one or more functions of the logs.

17. A log generated in accordance with the method according to claim 16.

18. A method according claim 1 wherein the logging tool is an array logging tool having a plurality of receiver coils each spaced respectively a different distance from a transmitter coil; and wherein the second log is derived from the signals generated in the logging tool by the receiver coil that is closest to the transmitter coil.

\* \* \* \* \*